United States Patent [19]

Peterson et al.

[11] 4,269,081

[45] May 26, 1981

[54] NEUTRAL POSITIONING DEVICE FOR A GEAR SHIFT LEVER

[75] Inventors: James F. Peterson, Franklin; Joe Crabtree, Lewisburg; Donald C. Coleman, Gallatin, all of Tenn.

[73] Assignee: The Murray Ohio Manufacturing Co., Brentwood, Tenn.

[21] Appl. No.: 96,330

[22] Filed: Nov. 21, 1979

[51] Int. Cl.[3] .......................... G05G 9/12; F16F 1/18

[52] U.S. Cl. .................................. 74/473 R; 267/150; 267/158

[58] Field of Search ............. 74/473 R, 476; 267/150, 267/158

[56] References Cited

U.S. PATENT DOCUMENTS

| | | | |
|---|---|---|---|
| 911,419 | 2/1909 | Marmon | 74/473 R |
| 1,163,648 | 12/1915 | Dodge | 74/473 R |
| 3,793,901 | 2/1974 | Muller et al. | 74/476 X |
| 4,111,344 | 9/1978 | MacDonald | 267/150 |

*Primary Examiner*—Allan D. Herrmann

*Attorney, Agent, or Firm*—Cushman, Darby & Cushman

[57] ABSTRACT

A cantilevered spring is supported proximate the transaxle of a piece of power equipment so as to be operatively related to the shift lever used to actuate the transaxle. The cantilevered portion of the spring comprises a main resilient section and an extension at its outer end which lies in a plane angularly related to that of the main section of the spring. The extension is provided with an elongated slot having a major axis which extends parallel to the plane of the spring's main section. The shift lever is received in the slot whereby actuation of the lever in a direction normal to the slot's major axis is resisted by the spring.

4 Claims, 2 Drawing Figures

NEUTRAL POSITIONING DEVICE FOR A GEAR SHIFT LEVER

BACKGROUND OF THE INVENTION

The present invention is intended for use in association with a transaxle (or a transmission) which is employed to drive various types of power equipment, such as riding lawn mowers. The transaxle includes a lever which is actuated to shift the transaxle between gear-engaging and neutral positions. In a typical transaxle, a conventional H or I-shaped shift pattern is used wherein the neutral position occupies a central portion of the pattern intermediate four gear-engaging positions respectively located at the extremities of the pattern.

When operating power equipment utilizing a transaxle, it is possible to inadvertently cause gear engagement by accidental displacement of the shift lever from the neutral portion of the pattern. It therefore is a principal object of the present invention to provide spring means acting on the shift lever tending to position the lever in neutral.

SUMMARY OF THE INVENTION

In order to achieve the objective just stated, the present invention utilizes a cantilevered spring arrangement which is operatively associated with the shift lever. More particularly, the cantilevered spring comprises a main resilient section having at its outer end an extension arranged to lie in a plane which is operatively associated with the shift lever. More particularly, the cantilevered spring comprises a main resilient section having at its outer end an extension arranged to lie in a plane which is angularly related to the main to lie in a plane which is operatively associated with the shift lever. More particularly, the cantilevered spring comprises a main resilient section having at its outer end an extention arranged spring section. The extension is provided with an elongated slot through which the shift lever projects. The major axis of the slot extends parallel to the plane of the main section of the spring, and the spring is oriented with respect to the shift pattern of the transaxle such that movement of the shift lever along the slot to the slot ends is required to permit normal shifting into the four gears. Displacement of the lever normal to the slot's major axis at any point along the slot is opposed by the resilience of the spring.

The invention now will be described in greater detail with reference to the accompanying drawings wherein:

FIG. 1 is a perspective view of a preferred embodiment of the present invention illustrating the operative relationship between the spring and the transaxle's shift lever; and FIG. 2 is a side elevational view of the arrangement illustrated in FIG. 1.

DETAILED DESCRIPTION OF THE INVENTION

Figure 1:
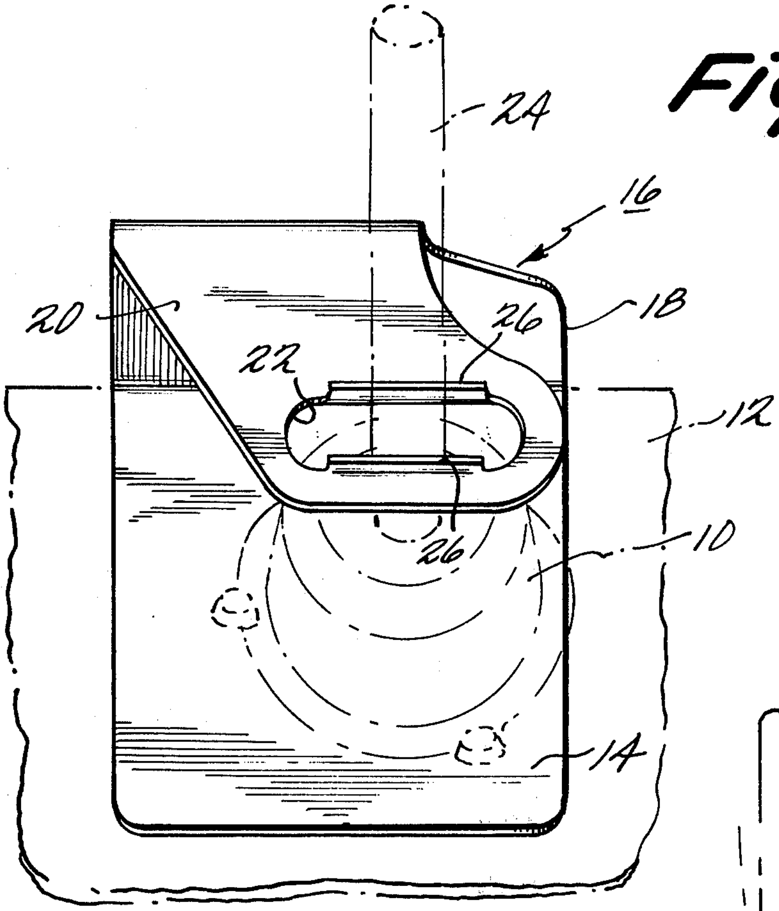
Figure 2:
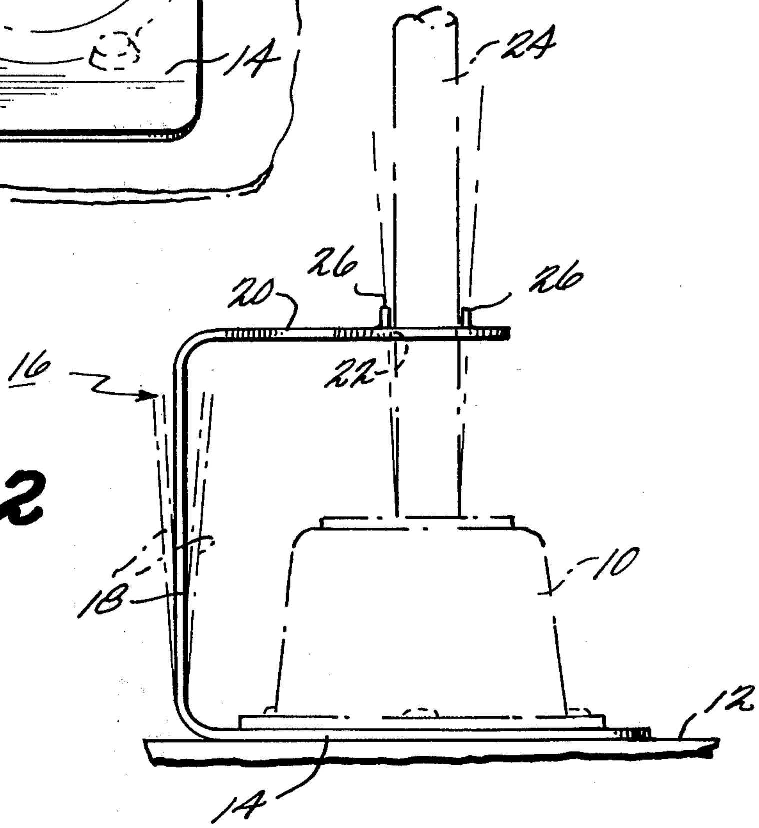

Referring to FIG. 1, a casting 10 which contains a shift lever pivot is mounted to a transaxle housing 12 of a piece of power equipment by means of fastening elements which also pass through a support portion 14 of a cantilevered spring arrangement, generally indicated at 16, so as to also secure the spring to the housing. Spring 16 preferably is formed from a single sheet of spring steel, the steel being bent at a first location to define the support portion 14 and a main resilient section 18 which is cantilevered from portion 14. An extension 20 of section 18 of the spring is formed by bending the steel sheet at a second location. Preferably, the extension 20 lies in a plane parallel to the support portion 14, both being normal to the plane of the main section 18 of the spring. The extension 20 is provided with an elongated slot 22 having a major axis which extends substantially parallel to the plane of main spring section 18. A shift lever 24 extends from casting 10 and passes through the slot 22, the diameter of lever 24 closely approximating the slot width.

The spring 16 is secured to transaxle housing 12 such that the major axis of slot 22 is oriented with respect to the shift pattern of the transaxle so as to require lever 24 to be displaced along the slot to its ends in order to allow the lever to be moved to the four gear-engaging positions. When shift lever 24 is moved in a direction other than along the major axis of slot 22, the lever engages an edge of the slot thereby displacing extension 20 and deflecting the main resilient portion 18 of the spring. The characteristic of the spring is to resist such deflection. Accordingly, the shift lever is urged back towards its neutral position. Such resistance to displacement of the shift lever from its neutral position reduces the possibility of accidental contact with the lever causing the gears of the transaxle to be engaged so as to inadvertently move the power equipment.

Of course, if the operator desires to effect gear engagement, the exertion of a force on the shift lever greater than the opposing force developed by the spring results in the selected gear being engaged. Once this occurs, the effect of the spring is overcome until such time as the operator returns the lever 24 to the neutral position.

It will be appreciated that repeated movement of the lever 24 along slot 22, as well as the transmittal of displacement forces against the edges of the slot by the selective actuation of the shift lever to engage the gears, can cause wear and deformation of the slot. To minimize this, flanges 26 are provided along the major edges of the slot 22 to allow greater surface area for distribution of the forces applied to the slot edges.

What is claimed is:

1. A device for resisting inadvertent actuation of a shift lever from a neutral position to a gear-engaging position, said device comprising:

a spring operatively associated with said lever, said spring including:

(a) a cantilevered main resilient section; and (b) an extension joined to an outer end of the cantilevered main section and lying in a plane angularly related to that of the main section, said extension being provided with an elongated slot adapted to receive said lever and having a major axis extending parallel to the plane of the main section, said spring being oriented with respect to the transaxle so as to urge the lever towards the neutral position when the lever is displaced in a direction normal to said major axis.

2. A device as set forth in claim 1, wherein the plane of said extension is normal to that of the main resilient section.

3. A device as set forth in claim 1, wherein said spring further includes flanges on said extension arranged to extend parallel to the major axis of the slot along the slot edges.

4. A device as set forth in claim 3, wherein the plane of said extension is normal to that of the main resilient section.

* * * * *